United States Patent [19]

Tracz et al.

[11] Patent Number: 5,634,121
[45] Date of Patent: May 27, 1997

[54] SYSTEM FOR IDENTIFYING AND LINKING DOMAIN INFORMATION USING A PARSING PROCESS TO IDENTIFY KEYWORDS AND PHRASES

[75] Inventors: William J. Tracz, Owego, N.Y.; Eric C. Newton, Odenton, Md.

[73] Assignee: Lockheed Martin Corporation, Bethesda, Md.

[21] Appl. No.: 454,482

[22] Filed: May 30, 1995

[51] Int. Cl.$^6$ .................................................. G06F 17/30
[52] U.S. Cl. .................................................. 395/602
[58] Field of Search .......................... 395/600, 700; 364/300, 900, 200; 355/600

[56] References Cited

U.S. PATENT DOCUMENTS

| | | | |
|---|---|---|---|
| 4,558,413 | 12/1985 | Schmidt et al. | 364/300 |
| 4,641,274 | 2/1987 | Swank | 395/601 |
| 4,794,519 | 12/1988 | Koizumi et al. | 395/602 |
| 4,920,499 | 4/1990 | Skeirik | 395/601 |
| 4,980,829 | 12/1990 | Okajima et al. | 395/601 |
| 5,019,961 | 5/1991 | Addesso et al. | 395/601 |
| 5,047,918 | 9/1991 | Schwartz et al. | 364/200 |
| 5,136,687 | 8/1992 | Edelman et al. | 395/607 |
| 5,173,854 | 12/1992 | Kaufman et al. | 395/616 |
| 5,265,065 | 11/1993 | Turtle | 395/603 |
| 5,295,256 | 3/1994 | Bapat | 395/614 |
| 5,345,586 | 9/1994 | Hamala et al. | 395/601 |
| 5,408,655 | 4/1995 | Oren et al. | 395/600 |
| 5,432,942 | 7/1995 | Trainer | 395/700 |
| 5,448,727 | 9/1995 | Annevelink | 395/600 |
| 5,452,449 | 9/1995 | Baldwin, Jr. et al. | 355/600 |

OTHER PUBLICATIONS

IBM TDB vol. 33, No. 9, Feb. 1991, "LAM Domain Database Migration Utilities" M. Lai et al.
IBM TDB vol. 36, No. 5, May 1993, "Utilities for Managing a Large Multi-Domain LAN Environment", S. A. Wadood.
IBM TDB vol. 32, No. 10B, Mar. 1990, "Hypermedia System", M. Ono.

Primary Examiner—Wayne Amsbury
Assistant Examiner—Charles Rones
Attorney, Agent, or Firm—Lane Aitken & McCann

[57] ABSTRACT

A hypertext editor captures general textual descriptions of various aspects of applications in a domain. A reference requirements editor lists (optional and required) input and output parameters for program functions in the domain. A "thing" editor lists services provided and required by "things" in the domain. A scenario editor lists high-level steps and a description of those steps to be performed by an application program in the domain. A domain dictionary records definitions of key terms and phrases used in the lists and descriptions of the reference requirements, "thing", and scenario editors.

7 Claims, 18 Drawing Sheets 5,634,121

SYSTEM FOR IDENTIFYING AND LINKING DOMAIN INFORMATION USING A PARSING PROCESS TO IDENTIFY KEYWORDS AND PHRASES

This invention was made with Government support under Contract No. F33615-91-C-1788 awarded by ARPA. The Government has certain rights in this invention.

FIELD OF THE INVENTION

This invention relates to a system and method for identifying and linking together information related to application programs that perform similar or related functions, and which use common resources. Such application programs and resources are referred to in the art and herein as a domain. The links facilitate user access to different parts of the domain when analyzing and studying the system. From this access to the system, the user is able to determine the types and functions of programs in the domain, definitions of common terms pertinent to the domain, program operational scenarios, the requirements of programs in the domain, and devices, objects and modules with which a program is associated.

BACKGROUND OF THE INVENTION

Large computer systems may have numerous applications performing similar or related functions. In the prior art, the functions, interrelations, and capabilities of programs designed and written at different times by different system analysts and different programmers may not be readily apparent overall because different terms have been used to express the same or similar concepts.

It is an object of the invention to provide editors and other software tools that will allow designers of software domains to enter descriptions, definitions, operational scenarios, requirements and designs concerning applications within a domain.

It is another object of the invention to provide software that identifies and links together key words and phrases within a domain.

It is a further object of the invention to allow review of the information linked together by the system and easy traversal between the linked information thereby aiding the programmer in the further design and implementation of the programs of the domain.

SUMMARY OF THE INVENTION

The present invention contemplates a set of editors and software tools that link general descriptions, formal definitions, operational scenarios, requirements, and high-level program designs by key words and key phrases.

In analyzing and constructing a high-level design of a domain, appropriate terms and phrases, high-level textual descriptions of various aspects of the domain, operational scenarios, requirements of the programs of the domain, and the resources that a program will need in the domain are all defined.

The present invention is used to structure this information. A hypertext editor captures general textual descriptions of various aspects of applications in a domain. A reference requirements editor lists (optional and required) input and output parameters for program functions in the domain. A "thing" editor lists services provided and required by "things" in the domain. For example, if a certain program is to generate a particularly formatted report, the "thing" editor lists a printer formatting module, a print driver module, and a printer location that can be used by the application program that generates that report. A scenario editor lists high-level steps and a description of those steps to be performed by an application program in the domain. A domain dictionary records definitions of key terms and phrases used in the lists and descriptions of the reference requirements, "thing", and scenario editors.

An autolinker links words and phrases within and between editors. These words and phrases are called anchors and keying in on one anchor in one editor provides automatic access to all other editor entries that use that word or phrase. The autolinker also can selectively search the contents of the editors for words or phrases that are used a number of times as candidates for dictionary entry as well as automatically create typed links between those words and phrases and existing words and phrases, thus, automatically, creating a cross reference. The structure of anchors and links is referred to as a hyper-web. Typed links allow one to differentiate between different meanings of a word (e.g. wind as in meteorology and wind as in "to wind a clock").

The output of the editors is a hypertext document capable of being browsed by numerous other tools (e.g., Mosaic, Netscape).

BRIEF DESCRIPTION OF THE DRAWINGS

The foregoing and other objects, aspects and advantages will be better understood from the following detailed description of a preferred embodiment of the invention with reference to the drawings, in which:

FIG. 2 also lists the structures of those database files.

DETAILED DESCRIPTION OF THE PREFERRED EMBODIMENT

Figure 1:
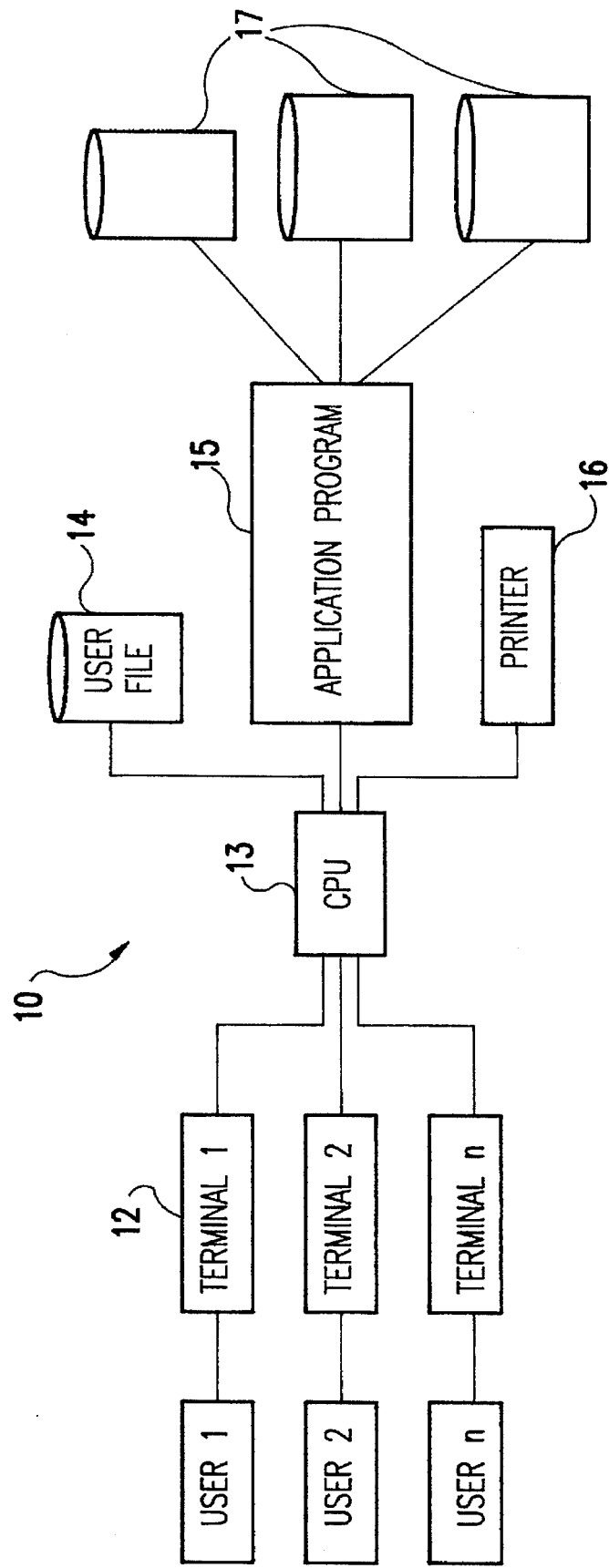
FIG. 1 is a block diagram illustrating the typical components of a domain.

FIG. 1 illustrates a typical computer system structure 10. One or more terminals 12 are connected to the computer system. The central processing unit (CPU) 13 handles all of the processing in the system. The system must first verify that a user is valid by checking the user's logon with the contents of the user database 14. After verification, the user may access and execute one or more application programs 15. Typical application programs involve accounting, inventory, payroll, or control functions. The application programs 15 have access to the application program database files 17. If the user desires any hard copies of the program output, it can be directed to the printer 16.

Figure 2:
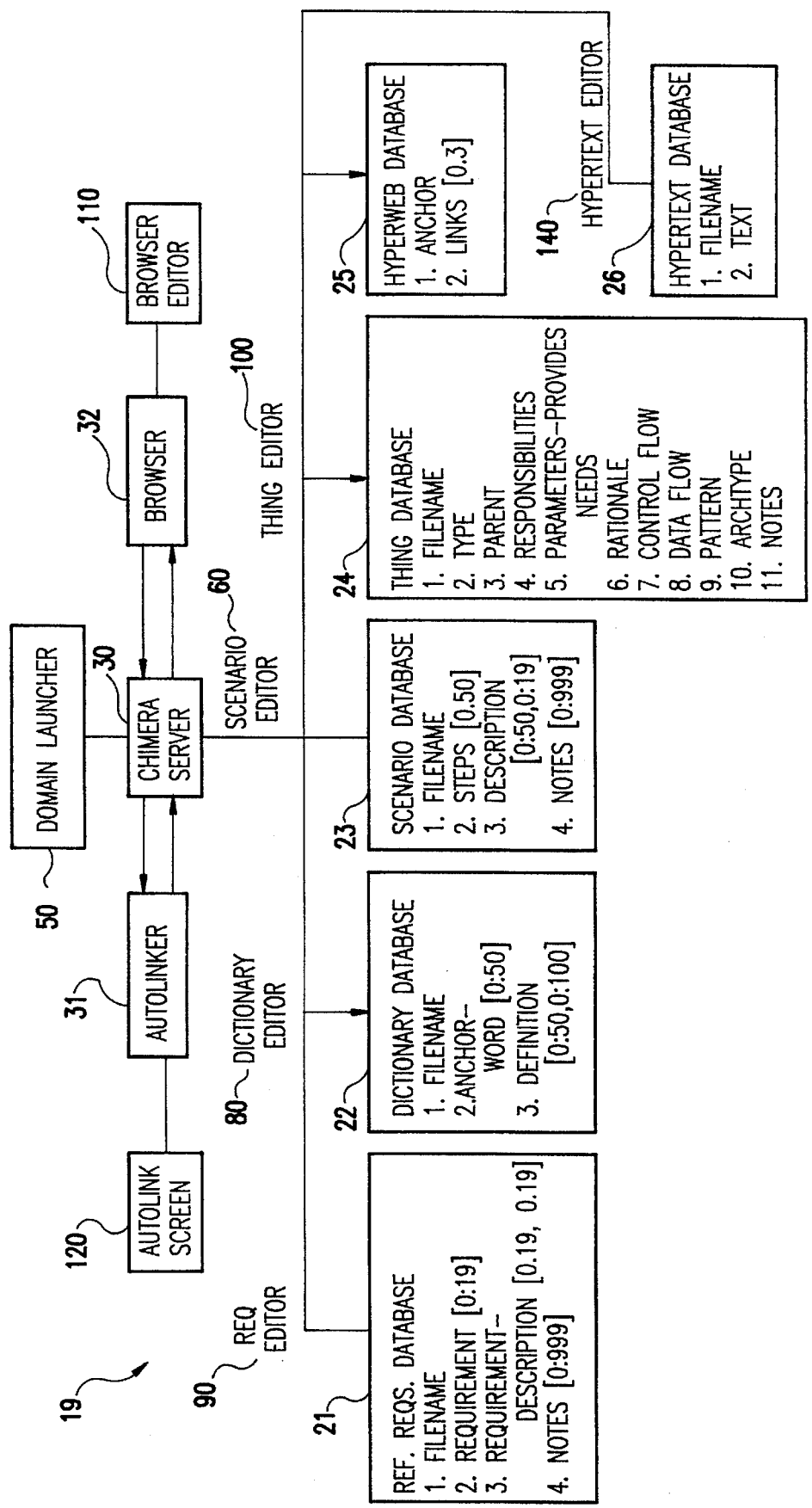
FIG. 2 is a block diagram illustrating the relationship between the invention's database server and the databases accessed by it.

The present invention is illustrated in FIG. 2. The hub of the system 19 is a database server 30 to which all other processes in the system 19 are connected. Suitable database servers (called hyperweb servers) are available to those skilled in the art; for example, a hyperweb server known as "Chimera" based on the work of researchers at the University of California at Irvine.

The database server 30 is connected to the databases of the system 19. Five of these databases are connected to the database server 30 through screen editors. For example, the database server 30 is connected to a requirements database 21 through a requirements screen editor 90. Similarly, the database server 30 is connected to a dictionary database 22 through a dictionary screen editor 80, a scenario database 23 through a scenario screen editor 60, a "thing" database 24 through a "thing" screen editor 100, and a hypertext database 26 through a hypertext editor 140. A user enters data into a database by invoking the appropriate editor, and the database server 30 writes that data to the database.

The dictionary database 22 contains the definitions of key words and phrases. The requirements database 21 contains requirements of an application program in a domain such as the types of functions applications the domain must have, or are optional. Program steps and descriptions of those steps are stored in the scenario database 23. The "thing" database 24 contains objects, modules, and services that can be used by processes in a domain along with their dependencies. For example, if an application program in a domain writes a report to a printer, the "thing" database 24 might identify a specific printer driver module for the programmer to use. The hypertext database 26 contains informal textual documentation of various aspects of applications in the domain.

The other database that the database server 30 is connected to is a hyper-web database 25. The hyper-web database 25 contains key words that occur in one or more of the databases 21, 22, 23, 24, and 26. These key words are referred to as anchors. It also contains data, referred to as links, indicating where in the databases 21, 22, 23, 24, and 26 the key words may be found. It is this relationship of anchors and links that form the structure of the hyper-web database 25. An autolinker process 31 creates this hyper-web database 25 by writing, through the database server 30, the anchors and links to the hyper-web database 25.

The database server 30 is also connected to a browser process 32. The browser process 32 allows a user to access the hyper-web through the database server 30 to analyze the hyper-web. The Browser process 32 is used primarily as a debugging tool.

A user enters the system 19, and through the domain launcher 50, starts the database server 30. After the user starts the database server 30, he accesses each screen editor, one at a time, for each of the five databases in the domain, i.e. dictionary, hypertext, reference requirements, scenario, and "thing." The user then enters the data into each database, the details of which will be disclosed later.

After data has been entered into the databases 21, 22, 23, 24 and 26, any user may access the system 19 to analyze the domain represented by the system 19. This subsequent user first starts up the database server 30 via the domain launcher 50. Through the database server 30, the user accesses any of the five databases 21, 22, 23, 24, and 26. From one or more of these databases the user submits the contents of the database(s) to the autolinker. The user then invokes the autolinker 31. The autolinker 31 first identifies key words and phrases within the submitted databases, and then, either automatically, or with user interaction, it links the key words and phrases selected by the user to the other databases. Through the database server 30, the system 19 writes the key word or phrase, also known as the anchor, and the links generated by the autolinker 31 to the hyper-web database 25. The hyper-web database 25 contains the key words and phrases, i.e. the anchors, and the links to the databases 21, 22, 23, 24, and 26 in which that anchor appears.

The autolinker 31 identifies the key words and phrases by parsing through the submitted databases. It functions like any parser in that it moves a pointer through the text being parsed, finds words or phrases that occur more than a user selectable number of times, and creates a list to display to the user. Specifically, the parser looks for key words (after normalizing the word using standard suffix truncation) and phrases up to 4 words in length in the submitted data bases, keeping track of where the word or phrase was found. It then ranks them in order of number of occurrences by word count length (i.e., four word phrases before three word phrases) and displays the results to the user. It the user desires a single word or phrase can be linked, automatically, or only certain instances of the word linked through user interaction.

The Browser 32 is a tool that allows a user who has added a new editor, tool or other feature to the system 19 to analyze the databases independent of the other tools and editors of the system 19. It displays the raw data of the anchors and links. This allows the programmer to debug the system 19.

Figure 3:
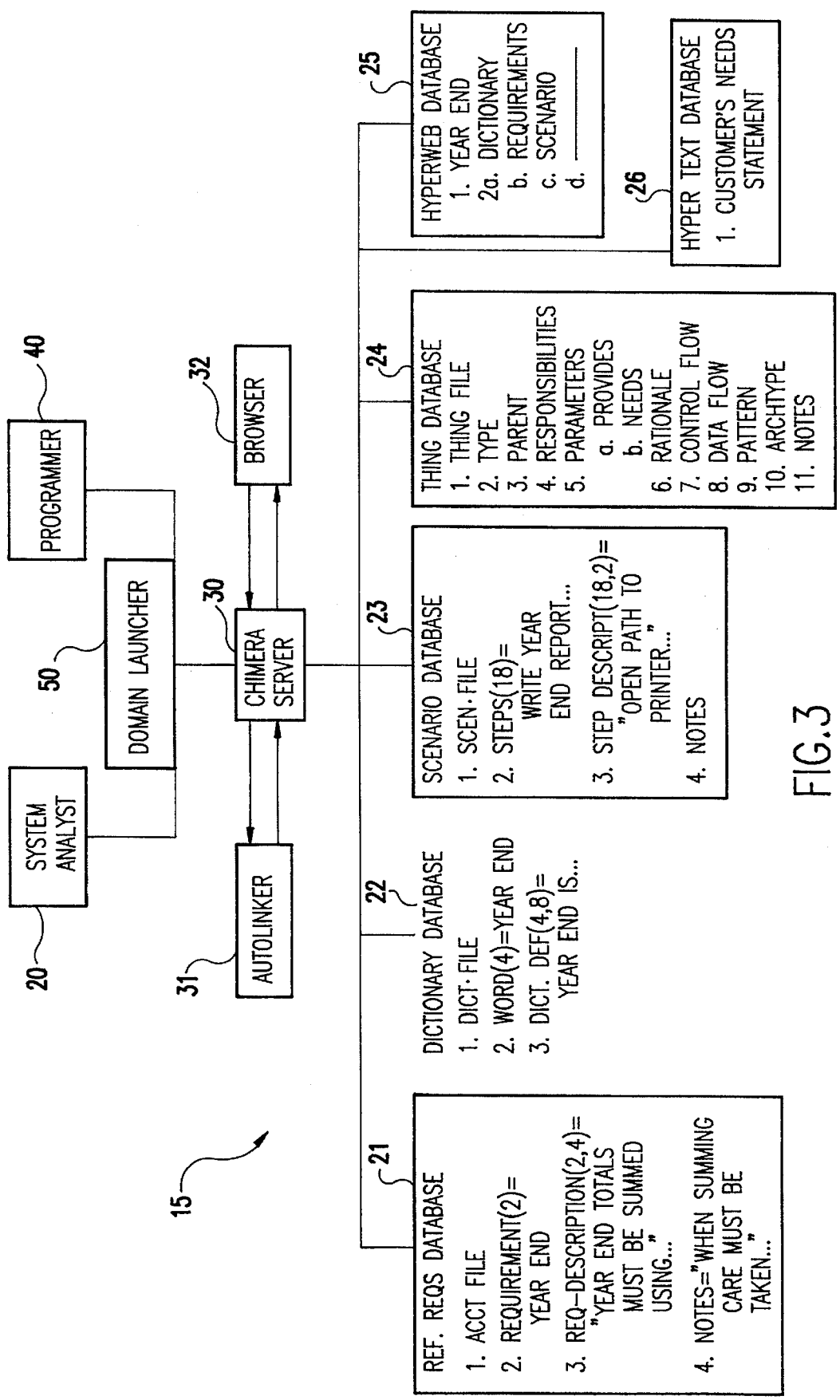
FIG. 3 is a block diagram illustrating a specific example of the relationship among the databases.

FIG. 3 illustrates an example of the system 19 of FIG. 2. The identifying numbers in FIG. 3 correspond to the identifying numbers in FIG. 2. In this example, the system 19 identified "year end" as a key phrase in the domain. The user ran the autolinker 31 on this key phrase, and the autolinker 31 located it in the dictionary database 22, reference requirements database 21, and the scenario database 23.

Figure 5:
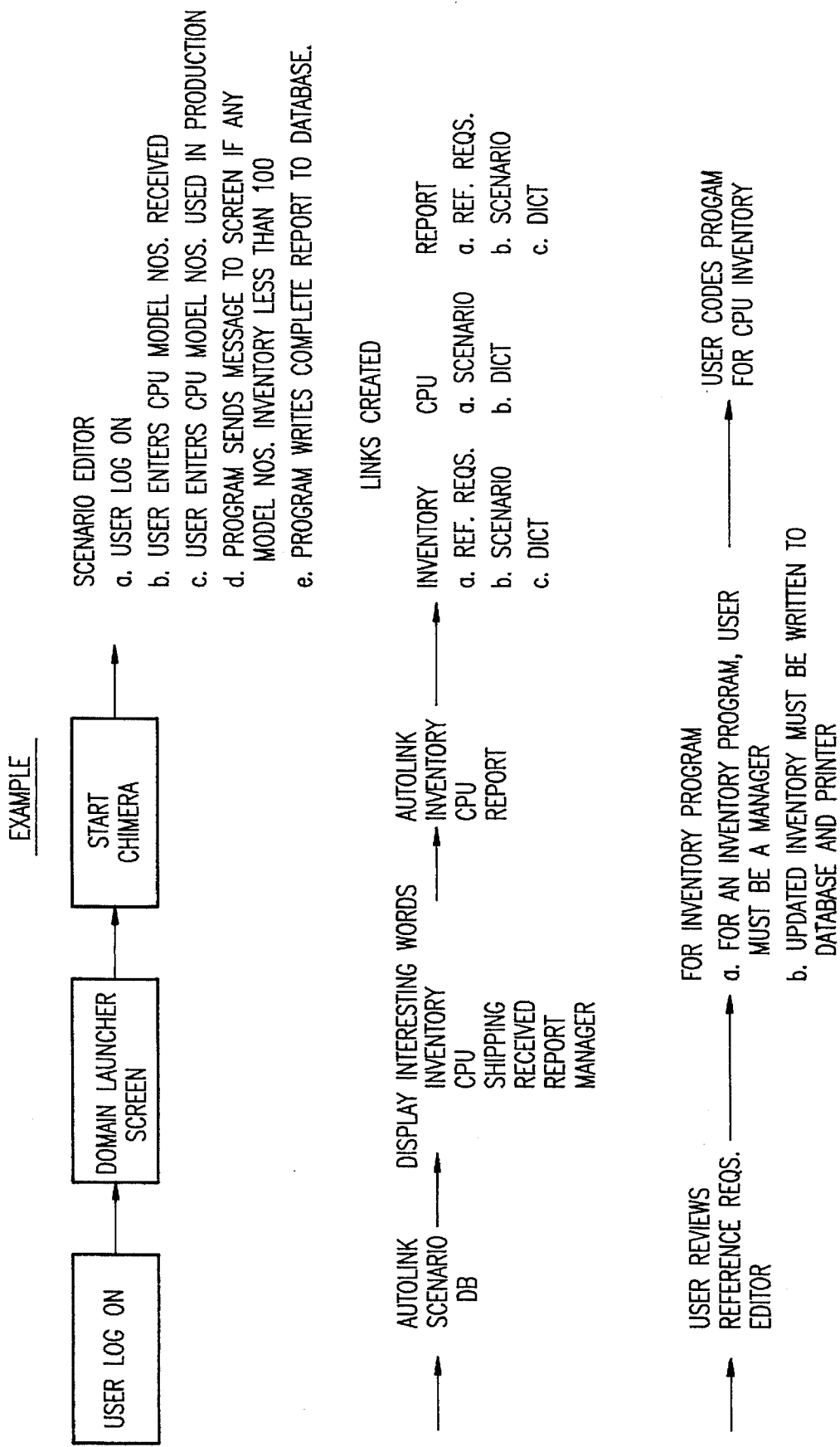
FIG. 5 is a flow chart illustrating a typical application of the invention.

FIG. 3 further illustrates that the hyper-web database 25 contains two fields. The first field is the name of the anchor, and the second field contains the links for that anchor. The hyper-web database 25 in FIG. 3 shows that the anchor "year end" is linked to the dictionary database 22, the reference requirements database 21, and the scenario database 23. Consequently, whenever the user is in either the dictionary editor 80, the scenario editor 60 or the requirements editor 90, he can move to the other two since the system 19 can access the hyper-web database 25 and trace the links to those other databases. FIG. 5 illustrates in chart form the roles of an initial user who entered the data into the databases 21, 22, 23, 24 and 26 and the subsequent user who accesses this data.

Figure 4:
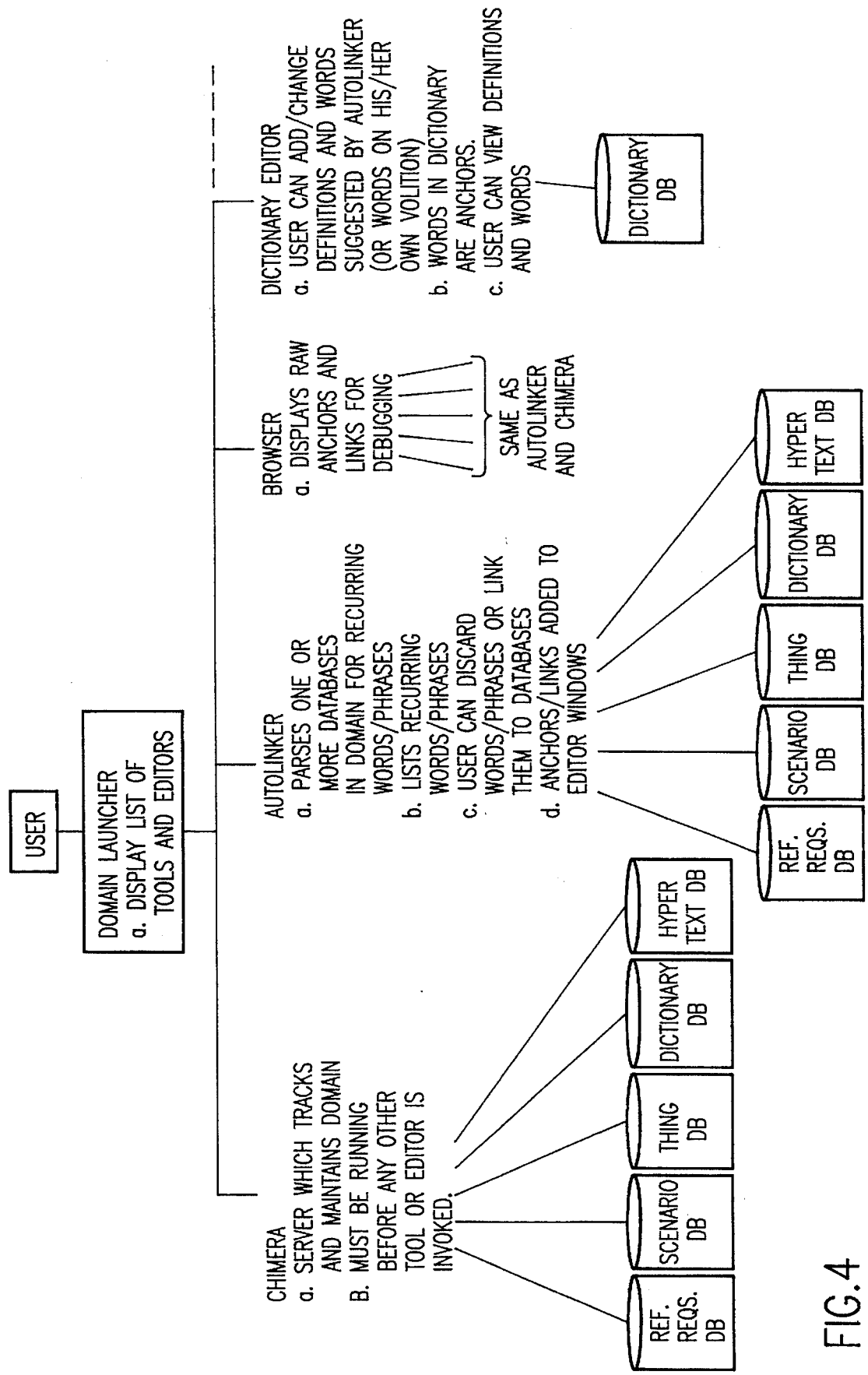
FIG. 4 is a chart illustrating the primary functions of each tool and editor, and the database files accessed by those tools and editors.
Figure 4A:
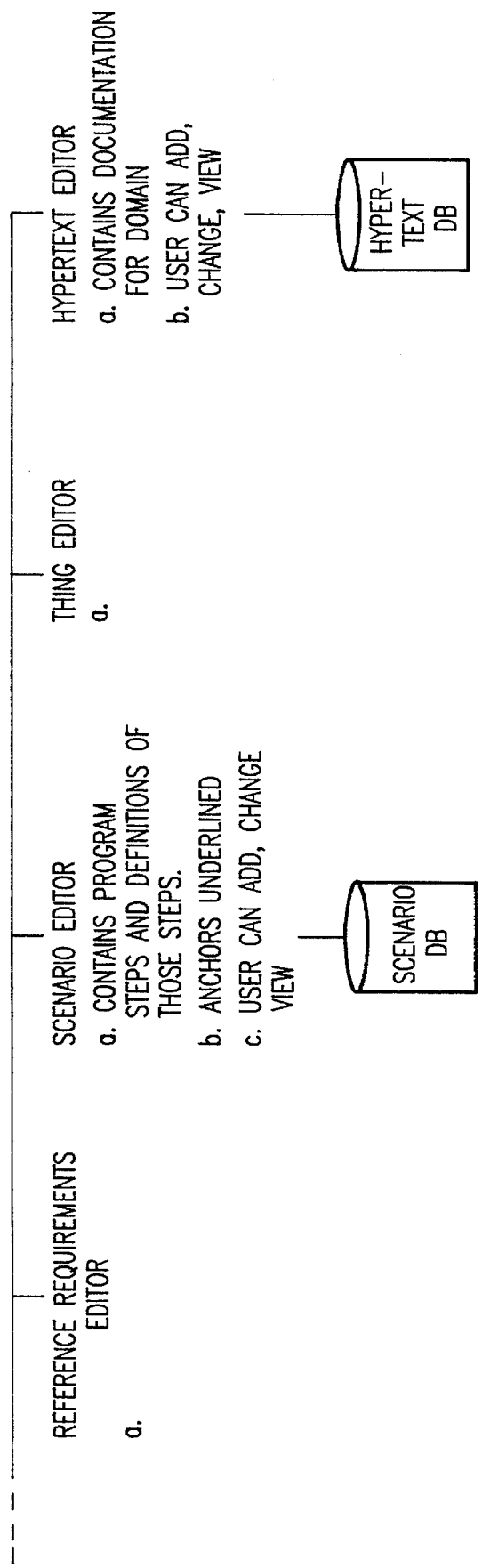

FIG. 4 illustrates the system 19 as previously illustrated in FIGS. 2 and 3. FIG. 4 however illustrates the primary functions of each tool and editor, and the databases to which those tools and editors have access.

EXAMPLE I

Figure 6:
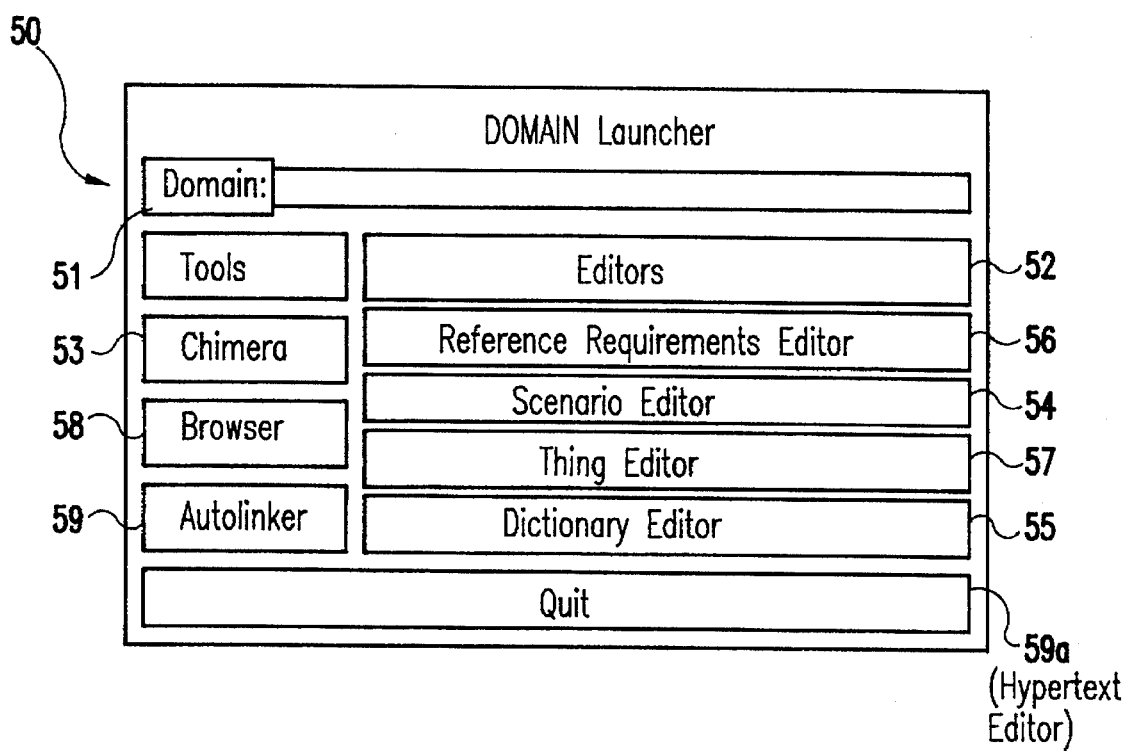
FIG. 6 illustrates the domain launcher screen.

The system flow will now be described in detail as seen by the user who creates the information in the databases 21, 22, 23, 24, and 26. The user starts the present invention's system of editors and tools by typing in "Launcher" at the terminal's prompt. The system 19 displays the domain launcher 50 as illustrated in FIG. 6.

The user may select a pre-existing domain by clicking on the "Domain" prompt 51 and viewing a list of domains from which an existing domain may be selected. Alternatively, the user may create a new domain by typing the name of the new domain in the "Domain" entry box 52.

Figure 7:
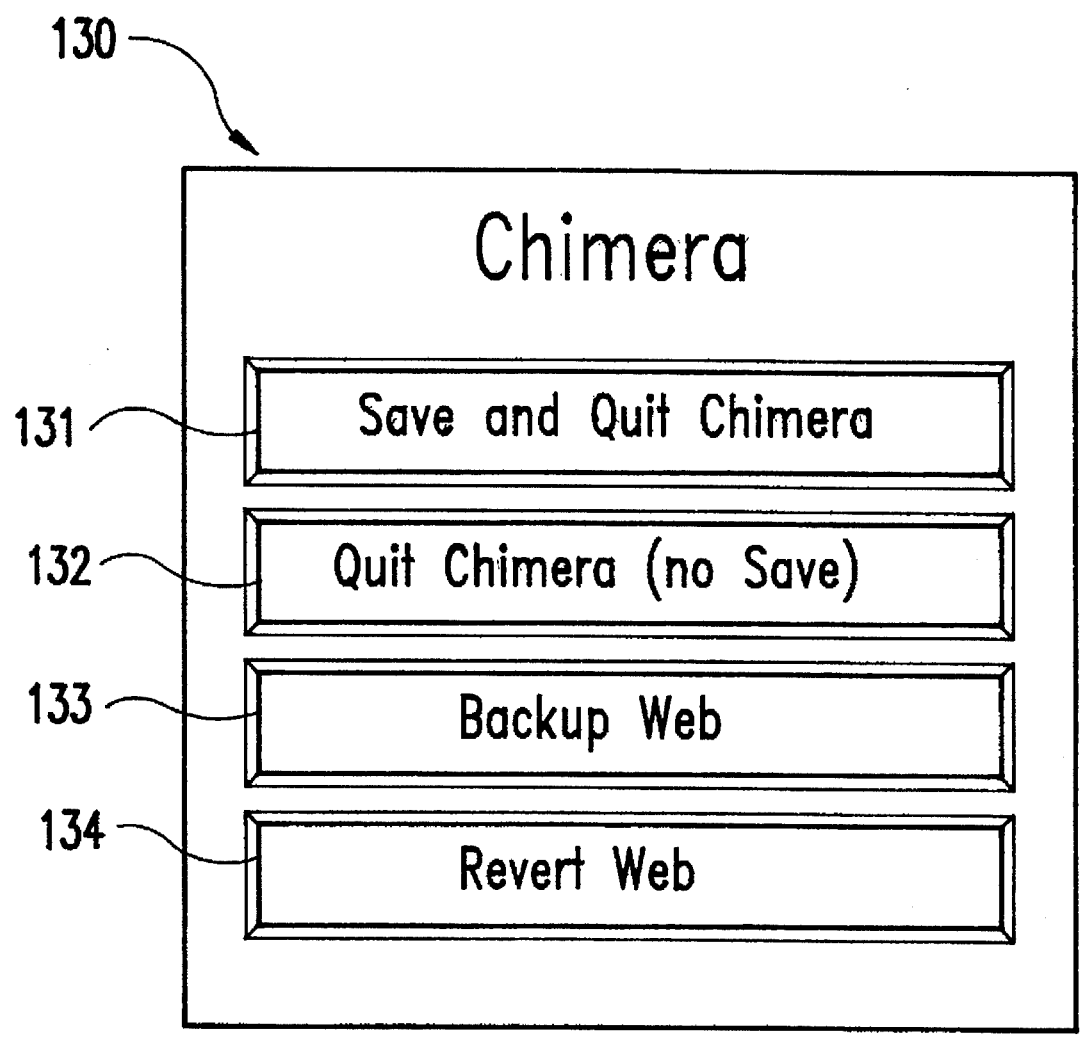
FIG. 7 illustrates the database server screen.

After selecting an existing domain or creating a new domain, but before selecting any of the editors or tools displayed by the domain launcher 50, the user must start the database server 30. The user starts the database server 30 by clicking on the "Chimera" prompt 53, and the system 19 displays the database server screen 130 (FIG. 7) in response to this. The user selects the first two prompts 131 and 132 to exit the system, the third prompt 133 to save the data and continue working, and the last prompt 134 to go back to the last saved hyper-web. The database server 30 maintains the hyper-web of information in the system 19 by tracking the anchors, views, links, viewers and objects in the domain. Objects are database files, viewers are graphical user interfaces, and views are the display of the database information on the screen via the graphical user interface.

Figure 11:
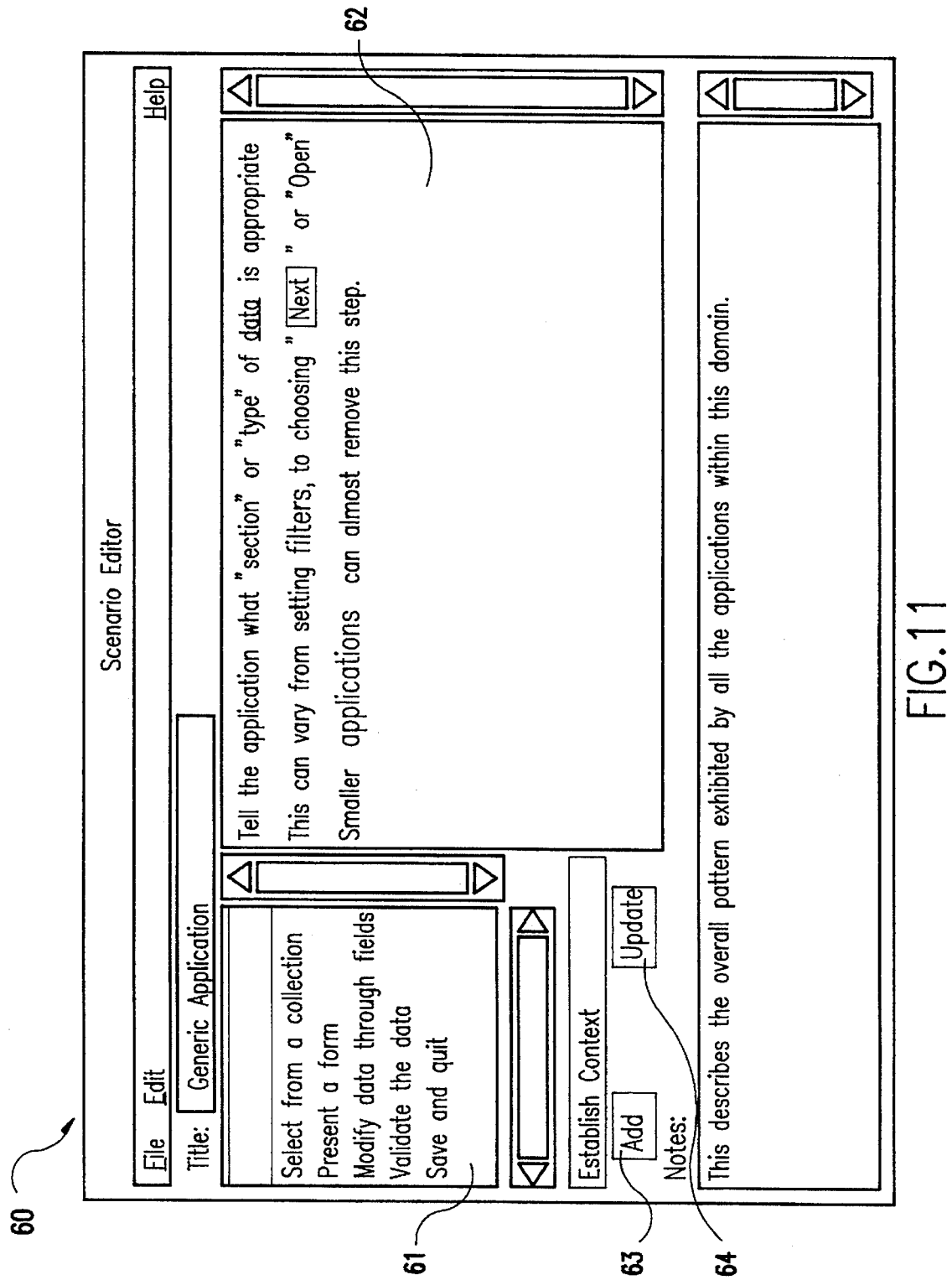
FIG. 11 illustrates the scenario editor screen.

The user invokes the scenario editor 60 (FIG. 11) by clicking on the "Scenario Editor" prompt 54 on the domain launcher screen 50. The scenario editor 60 provides an interface for the user to record scenarios and study these scenarios. Scenarios describe the functionality of applications in a given domain, and the descriptions of applications in a scenario may be used to link to information in the dictionary 22, reference requirements 21, hypertext 26, or "thing" 24 databases.

Figure 8:
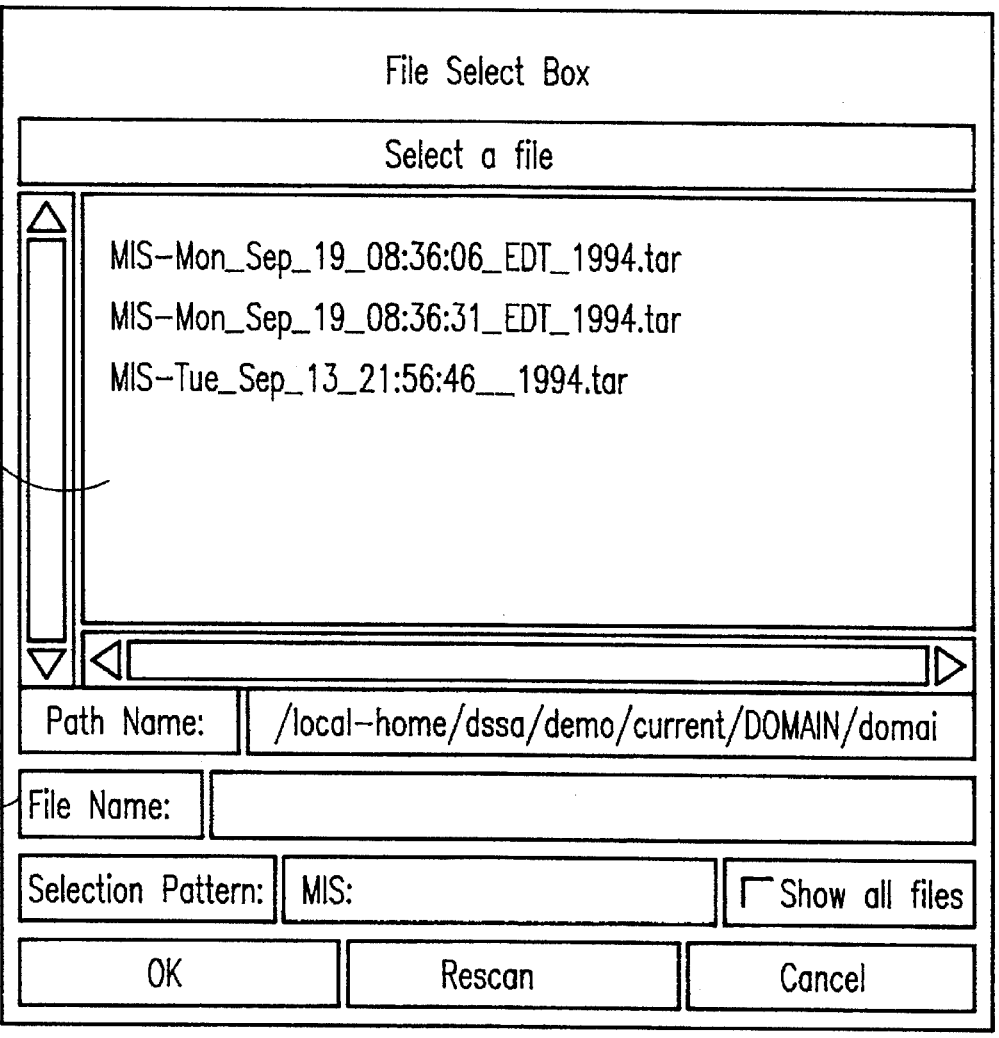
FIG. 8 illustrates the file select box.

When the user selects the "Scenario Editor" prompt 54 from the domain launcher 50, the system 19 displays the scenario editor screen 60 (FIG. 11) and a file select box 70 (FIG. 8). The user must select a preexisting file from the file select box 70, or type in a new file name in the file select box 70.

After the user selects a scenario from the file select box 70, the system 19 displays the processing steps of that scenario in the left hand window 61 of the scenario editor screen 60. The user may then click on any of the displayed steps, and the system 19 will display a more detailed description of the selected step in the right hand window 62. Any words or phrases in the detailed description of a step that are anchors are highlighted. The user may add or update a step to the scenario database 23 by clicking on the "Add" box 63 or the "Update" box 64 respectively. The user may also add or update a step description by clicking on that step in the left hand window 61, and then adding or updating that description in the right hand window 62.

The user invokes the dictionary editor 80 from the domain launcher 50 by clicking on the "Dictionary Editor" prompt 55. The system 19 displays the dictionary editor 80 (FIG. 9) and the file select box 70 (FIG. 8). The user must first select a particular dictionary file by either clicking on a file name displayed in the window 71 of the file select box 70 or by typing in a name of a file in the "File Name" field 72.

Figure 9:
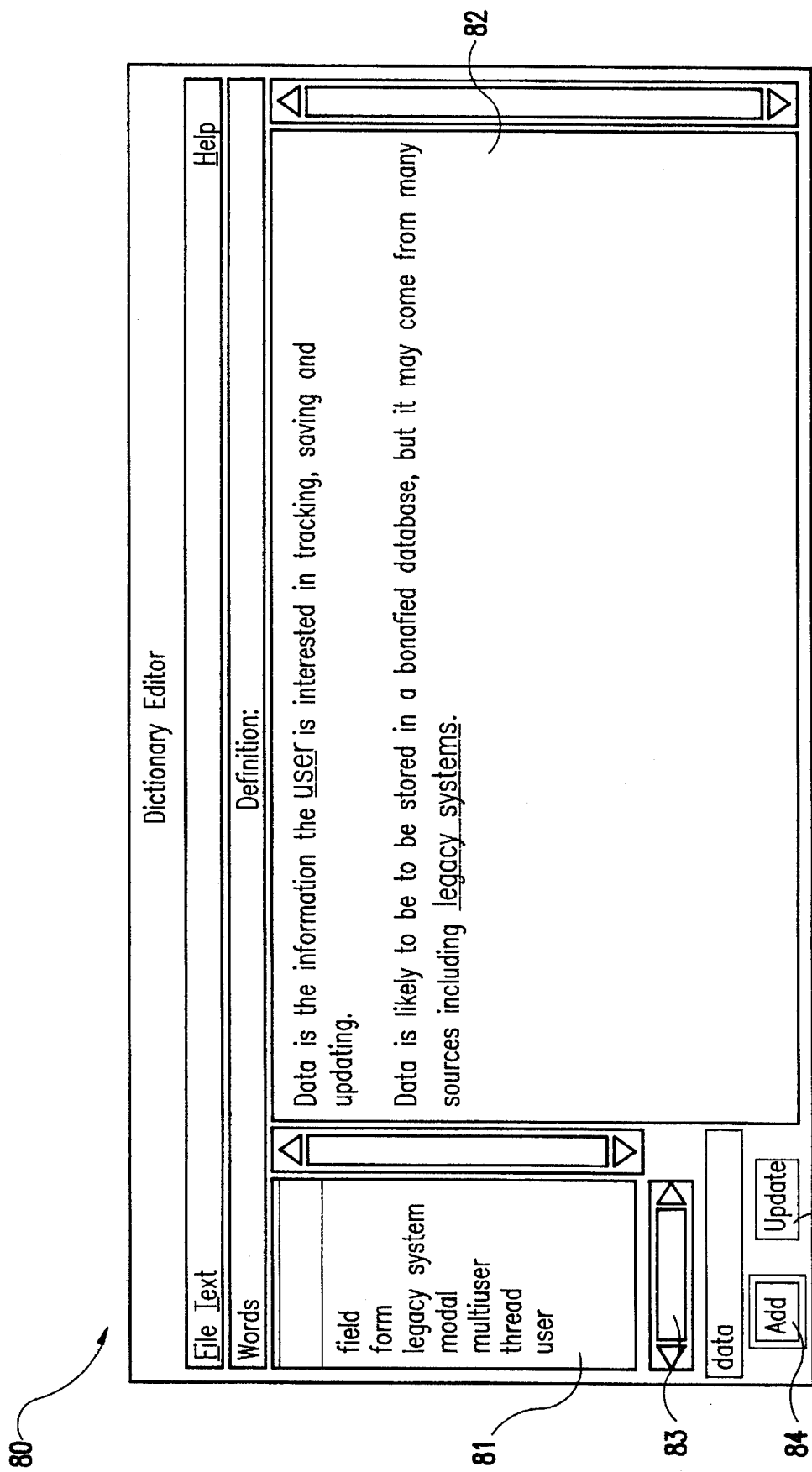
FIG. 9 illustrates the dictionary editor screen.
Figure 10:
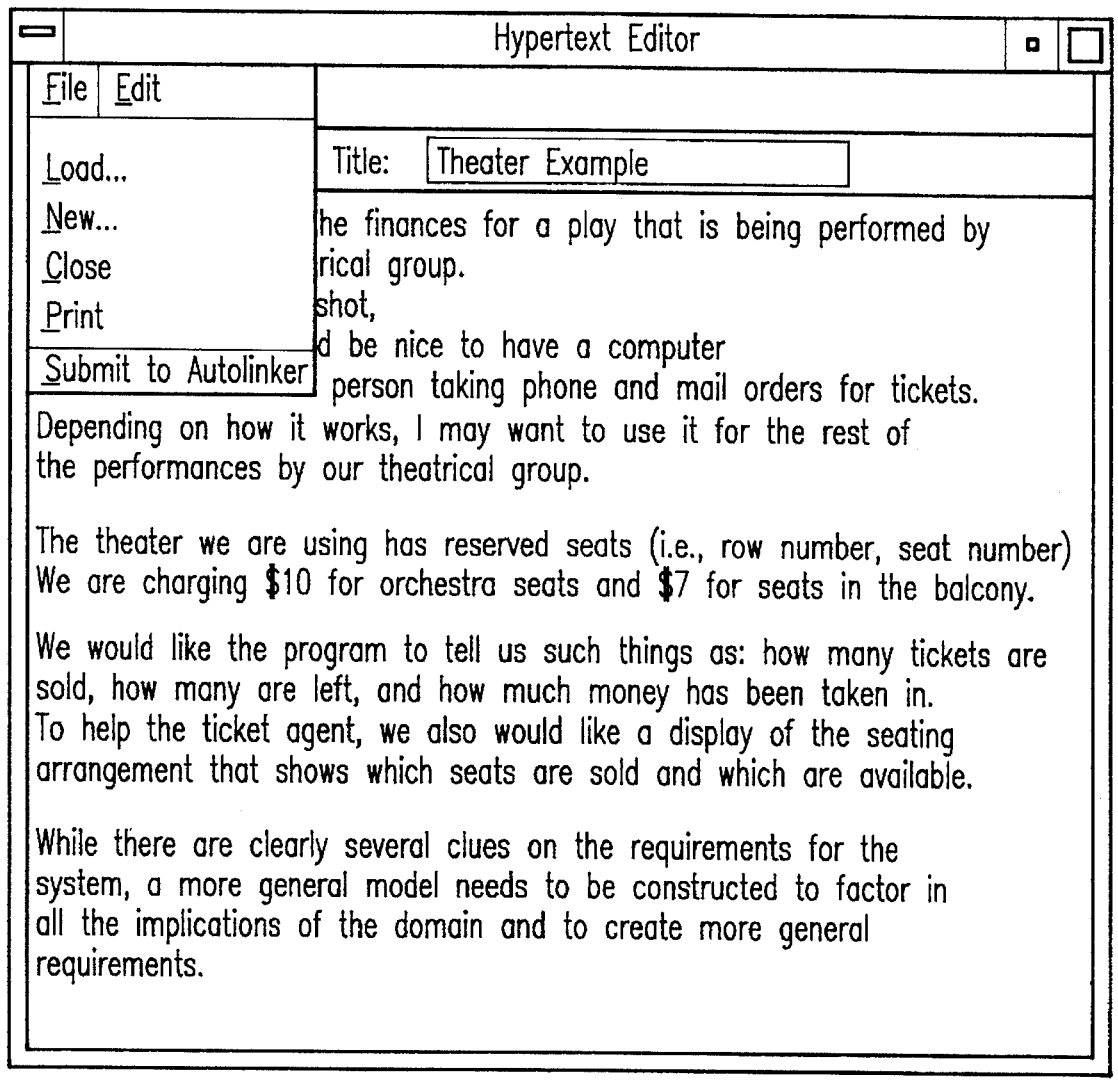
FIG. 10 illustrates the file pull down menu.

The dictionary editor 80 displays a list of words in the window 81 (FIG. 9). These words are always anchors. The user views the definition of a word by clicking on that word in the window 81. The definition of the selected word appears in the text window 82 of the dictionary editor 80. Any word in the definition which is underlined is an anchor.

It is a simple matter for the user to add or change a word, or change the definition of an existing word. To add a word to the dictionary, the user moves the mouse to the dictionary word entry box 83 below the dictionary list, clears the entry box if necessary, types the word to be entered, and clicks on the "Add" button 84 or presses the <Enter> key. A user adds a definition for a word in the dictionary window 81 list by simply selecting that word from the dictionary window 81 and then typing the definition in the text window 82. The user changes a word by selecting the word from the dictionary window 81, moving the mouse to the dictionary word entry box 83, correcting the word, and clicking on the update button 85.

Figure 12:
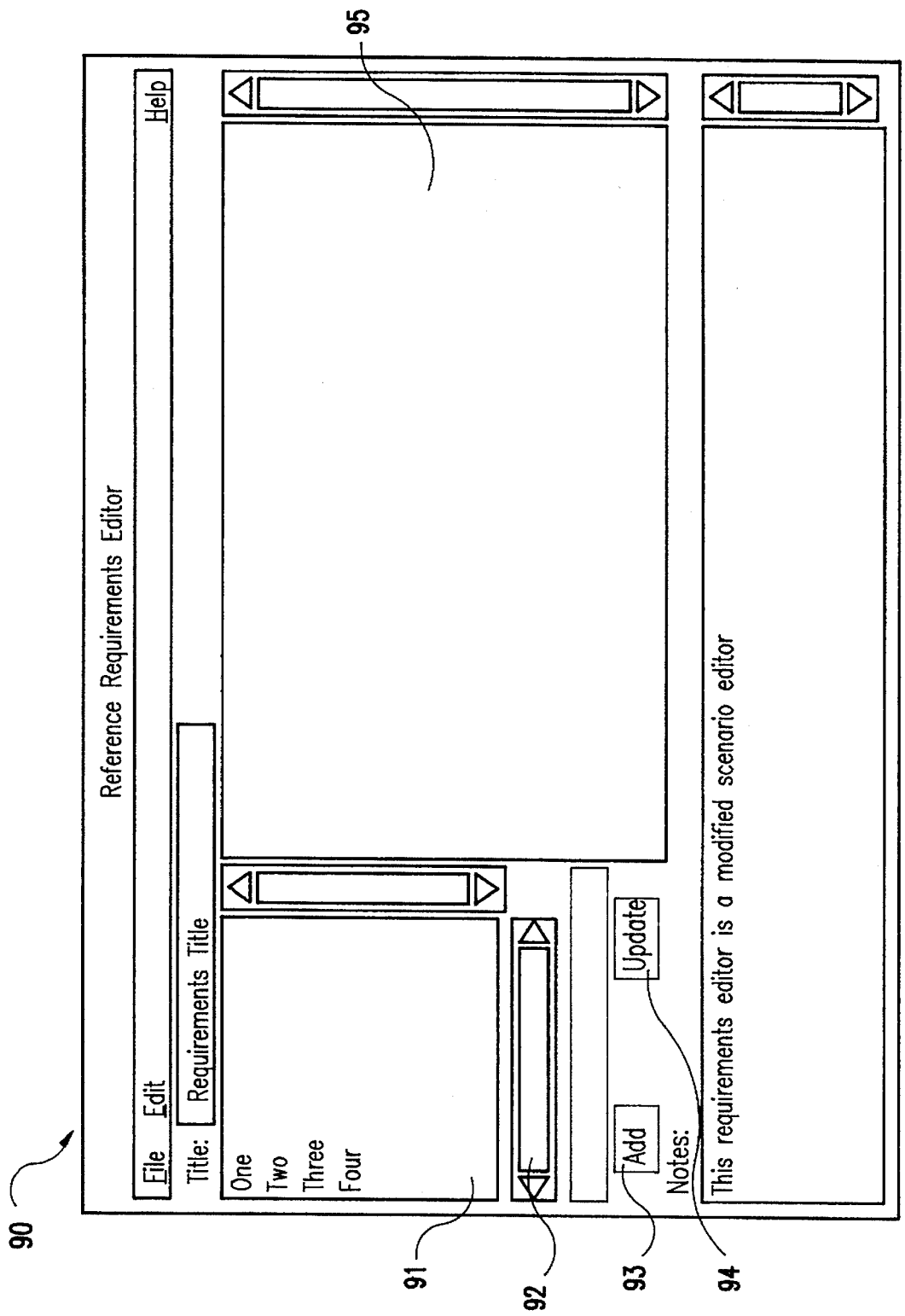
FIG. 12 illustrates the reference requirements editor screen.
Figure 13:
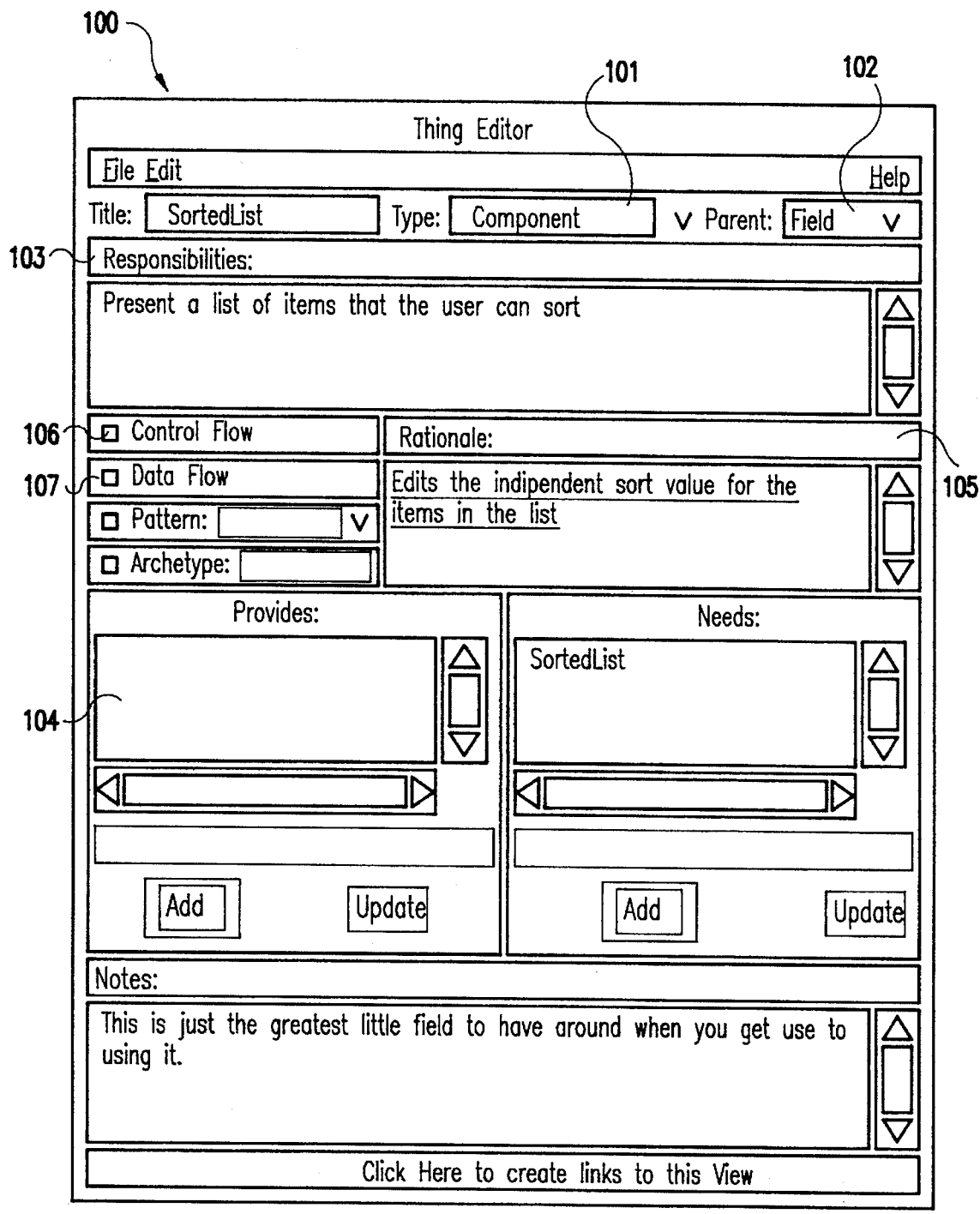
FIG. 13 illustrates the thing editor screen.

The user employs the reference requirements editor 90 (FIG. 12) to begin defining the high level requirements and implementation constraints for applications in the domain. The requirements database 21 consists of a list of requirements and a description of each requirement.

The user selects the "Reference Requirements Editor" prompt 56 from the domain launcher 50 to initiate the defining of requirements. The system displays the reference requirements editor 90 (FIG. 12) and a file select box 70. From the file select box 70, the user enters the name of a new requirements file at "File Name:" prompt 72 or selects a file that already exists from window 71.

The window 91 displays a list of the requirements. The user can add a requirement by typing the name of the requirement in the entry box 92 below the list and clicking the "Add" button 93 or pressing the <Enter> key. The user can easily re-order the requirements by clicking on a requirement and dragging it up or down the list of requirements. To add or update the description of a requirement, the user clicks on the desired requirement in the list, and adds or updates the description in the window 95.

The "thing" editor 100 permits the user to develop a high level design for an application program 15 in a domain 10. The user describes the services provided by this "thing" and its dependencies/interactions with other resources in the domain 10. For example, it may be a requirement of the domain 10 that all Payroll programs be written in COBOL (as stated in the reference requirements database 21). In this case, the "thing" editor 100 may indicate that all State Tax "things" must provide certain operations and use certain payroll record fields.

The user starts the "thing" editor 100 by selecting the "Thing Editor" prompt 57 from the domain launcher 50. The system 19 displays the "thing" editor 100 (FIG. 9) and a file select box 70. The user either selects a pre-existing file from window 71 or types in the name of a new file at the "File Name:" prompt 72.

In the type field 101, the user has the option (from the pull down menu) of selecting components, realm or domain attribute for the "thing" being described. The domain is the root, the top of a hierarchical design, through which all other entities communicate. (There exists one root "thing" in each domain.) The user may also indicate that this "thing" is a realm in type field 101. A realm is a template for other "things" to fit into (i.e., a realm defines a "virtual machine interface" that component-type things must adhere to) that implement the same virtual machine. The user can also select the component-type attribute, which indicates that this "thing" belongs in a realm (specified by the parent field 102) (i.e. it is an implementation of a virtual machine defined by the parent realm).

In the parent field 102, the user enters the realm to which a component-type "thing" belongs. The user can select the parent-type "thing" from the pull down menu, if it already exists, or the user can type the name directly into the parent entry box 102.

The user next must provide the "Responsibilities" field 103, the "Provides/Needs" field 104, and the "Rationale"

field 105. In the responsibilities field 103, the user describes what the entity is supposed to do. The provides/needs field 104 is an informal interface to the "thing" in that it lists what the "thing" needs (inputs) and what services the "thing" provides (output). The user describes the reasons for the individual entries in the provides/needs field 104 in the rationale field 105. Each item in the provides and needs list has its own rationale.

The first time the user selects the control flow box 106, a link will be created to a control flow diagram for the "thing." Each subsequent access will result in the display of the control flow diagram. Likewise, when the data flow box 107 is selected, the similar result happens for the data flow diagram for the "thing."

The Hypertext Editor 140 allows the user to include any textual documentation as part of the domain description. The user either types in the information in the hypertext window or uses a pull down menu to select the insert option and specify the name of the file that contains the text data.

The Browser 32 allows the user to display either all the views, objects, viewers, anchors or links in the hyper-web database 25. It is especially useful to a user who may be extending the system 19 by adding his own editor and who needs the capability to verify links and anchors independent of the tools and editors that generate the links and anchors.

Figure 14:
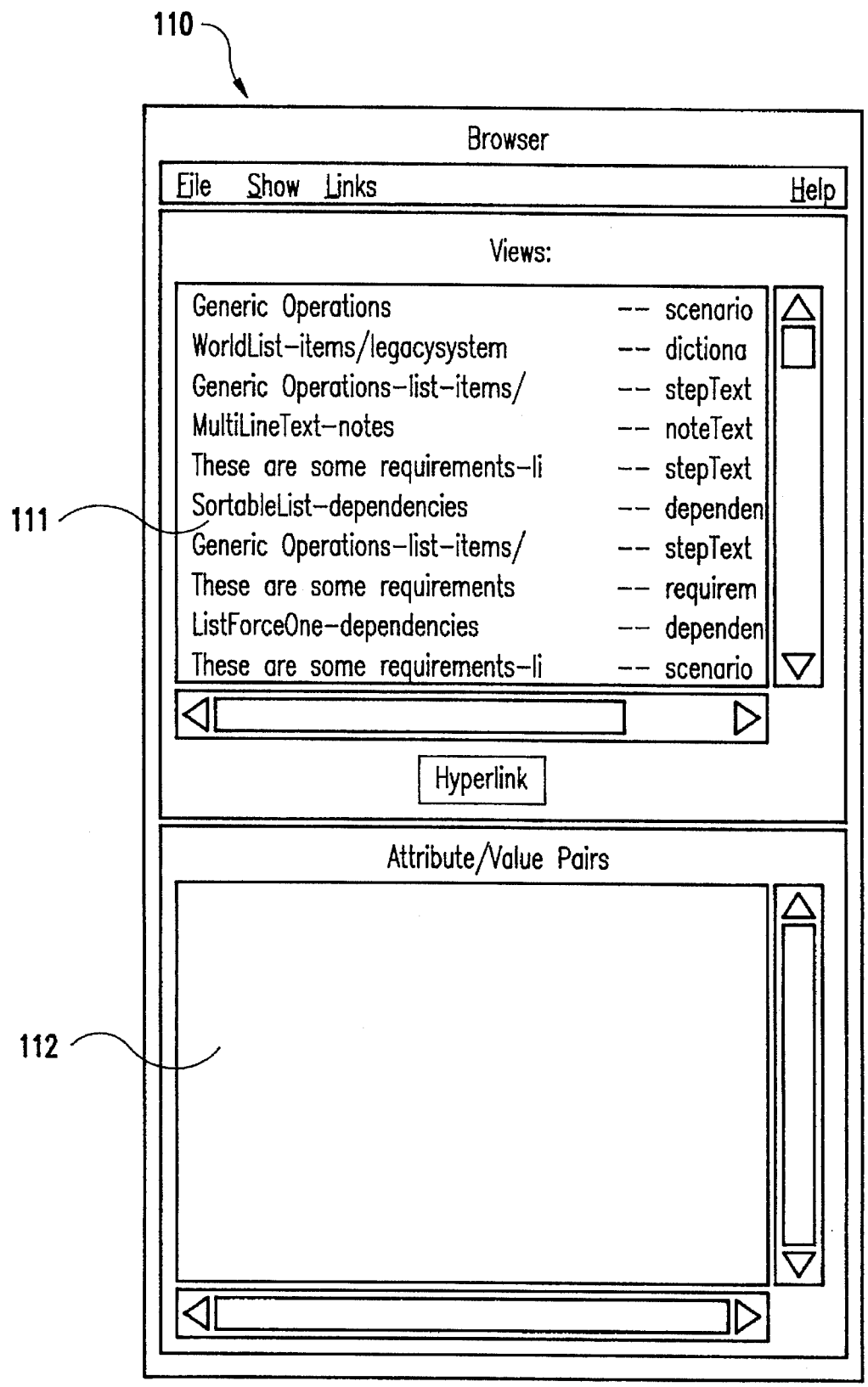
FIG. 14 illustrates the browser screen.
Figure 15:
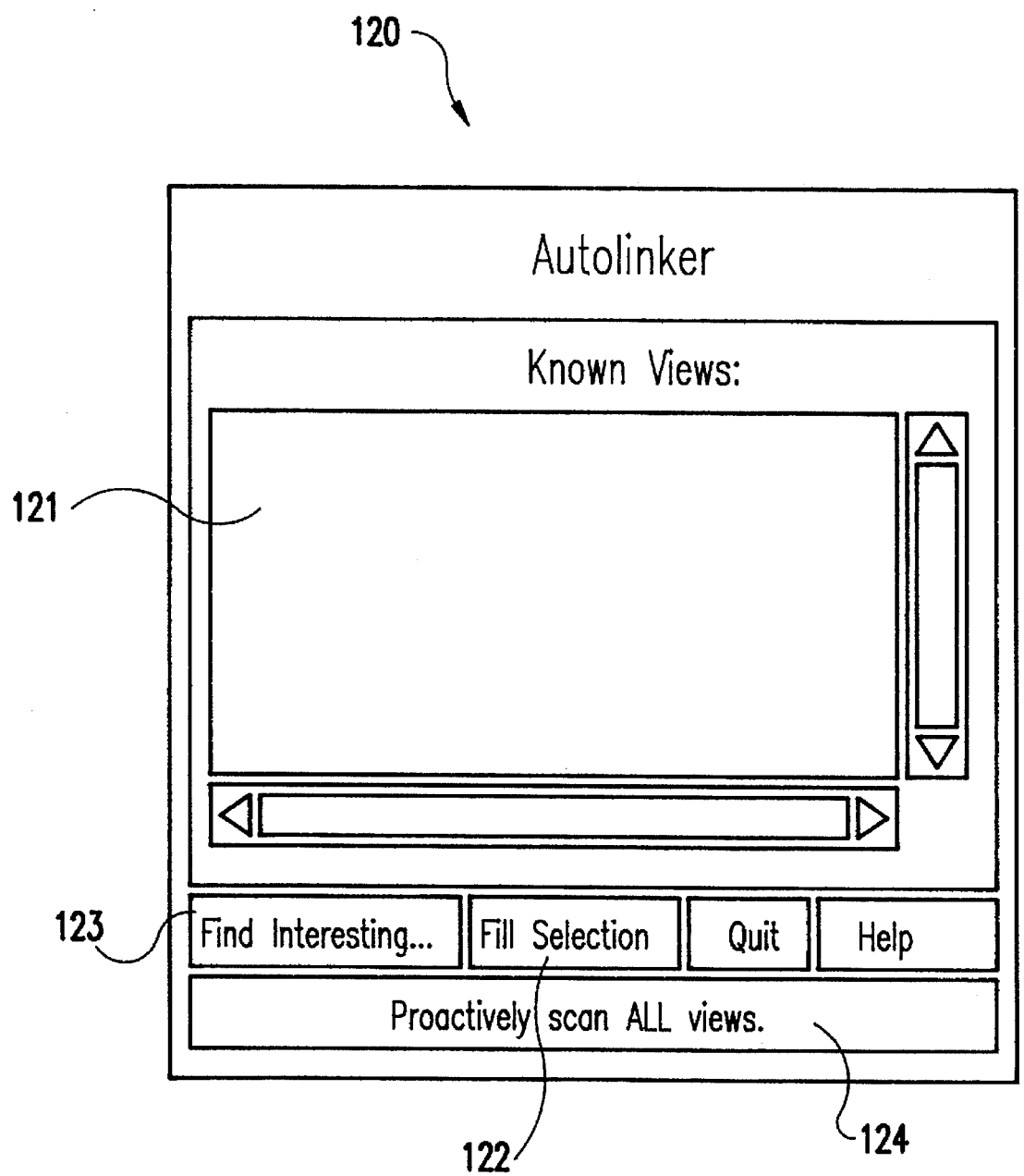
FIG. 15 illustrates the autolinker screen.
Figure 16:
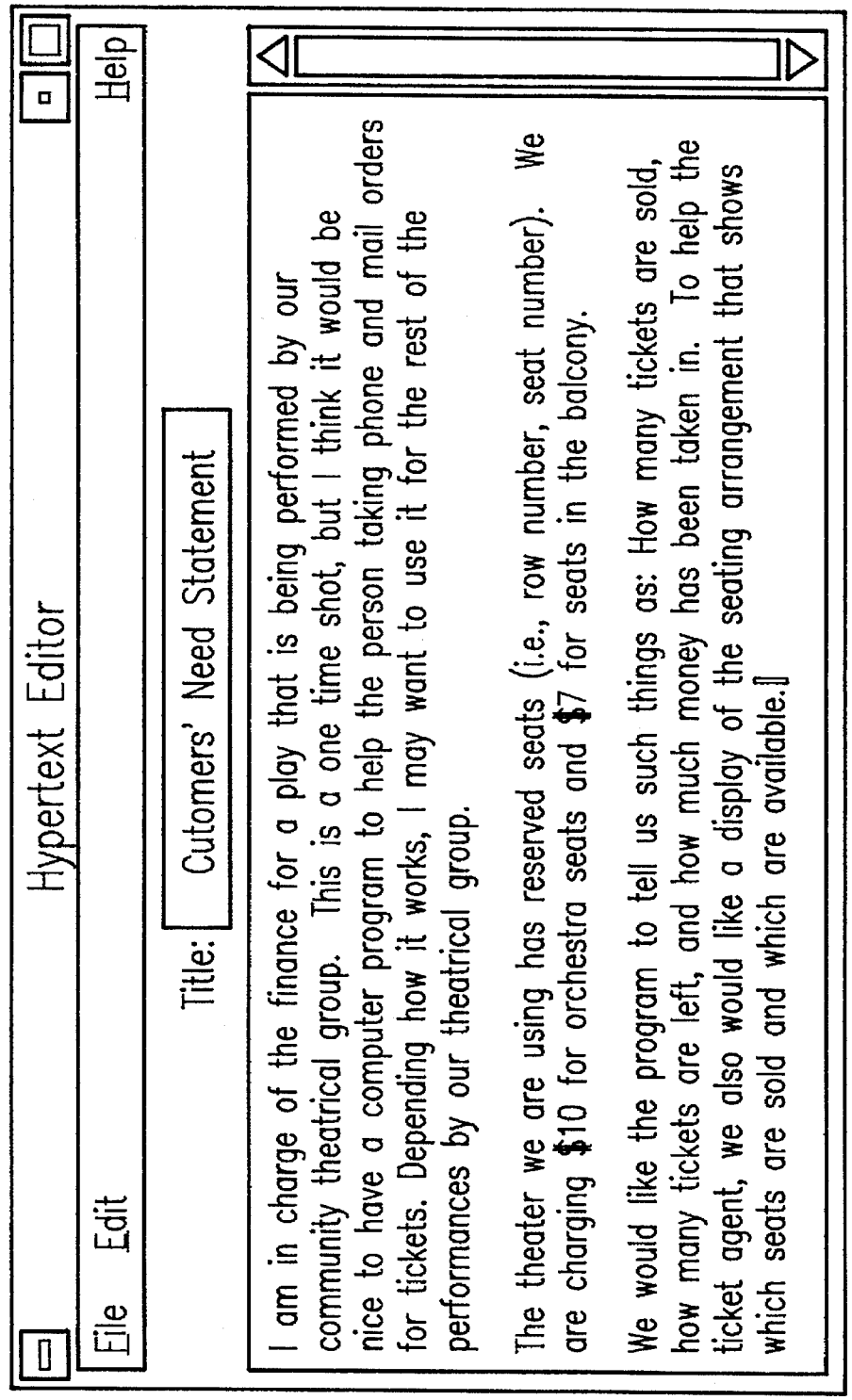
FIG. 16 illustrates the hypertext editor screen.

The user 40 starts the Browser 32 by selecting the "Browser" prompt 58 from the domain launcher 50. The system displays the Browser screen 110 (FIG. 14). The user can switch among displays of Views, Objects, Viewers, Anchors, or Links by clicking on the appropriate button in the File pull down menu.

The user employs the browser 32 by clicking on any entry in the upper window 111 of the browser screen 110, and various bits of debug into will appear in the "Attribute/Value Pair" window 112.

The autolinker process 31 is started by selecting the "Autolinker" prompt 59 from the domain launcher 50. The system 19 displays the autolinker screen 120. The user should then bring up an editor, go to the File pull down menu, and elect the "Submit to the Autolinker" option. At this time, the autolinker screen 120 displays the "Known views" screen 121 which contains all the objects in the editor (that the user previously brought up) that the autolinker 31 can examine for possible links.

From the autolinker screen 120 the user selects the views that are autolinked. The user can click on the objects within the "Known views" screen 121 that should be involved in the autolinking process, or the user can select the "Fill Selection" prompt 122 to select all of the objects. The "Proactively scan ALL views" prompt 124 autolinks all views in the system 19.

Figure 17:
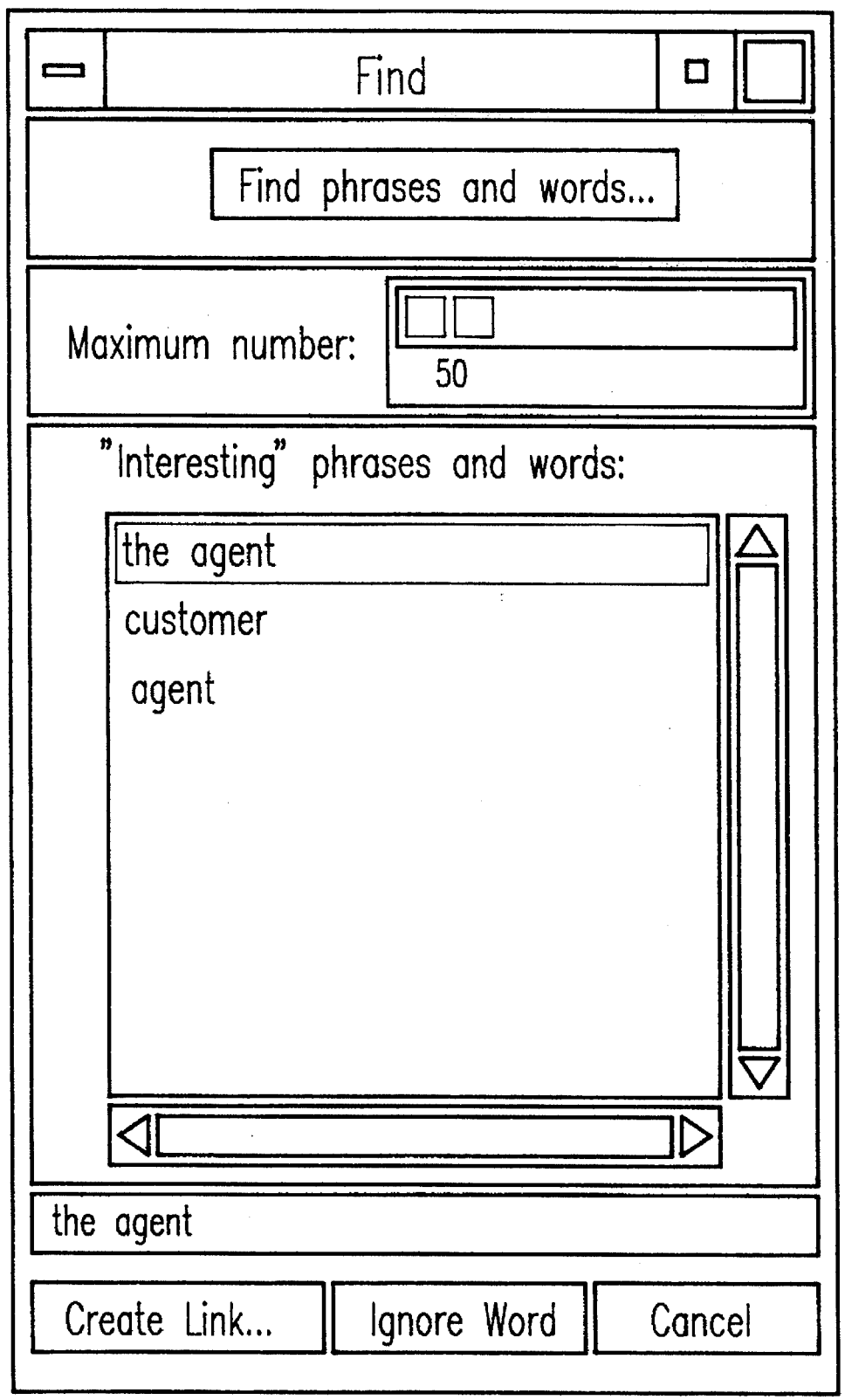
FIG. 17 illustrates the find screen.

The user should now click on the "Find Interesting" field 123. The system 19 displays the "Find" window (FIG. 17). The user should then click on the slider bar at the top of the screen, and select the number of occurrences of words or phrases that make it "interesting."

The system will then proceed to find all "interesting" words. An "interesting" word is a word that occurs more than the prescribed number of times in the objects listed in the "Known views" field 121.

The autolinker 31 displays all the interesting words and phrases in the middle of the Find window. The user can remove words from the list by selecting them with the mouse and clicking on the "Ignore Word" button. Alternatively, the user can create a link at this point by selecting a word or phrase from the list and selecting the create link option. The user also has the option of typing in a word to be used as a link. The Autolinker 31 prompts the user to name (type) the link being created (default is the word). The system displays a "Status:" window indicating which viewer it is processing, and it also updates the contents of each text window which the submitted editors will change accordingly as anchors and links are added.

At any point in time, the user can request that the contents of each database be output as a plain report or a hypertext document.

EXAMPLE II

Many times a programmer or programming group will receive from management or a client a voluminous document (for example hundreds of pages) describing the functions that a proposed system should possess. The present invention can be used in the following manner to aid in the design and writing of programs for that system.

The programming group will take a soft copy of the document (either provided directly by management or by scanning a hard copy of the document) and initiate a domain dictionary by autolinking the document. This will produce a cross referencing of the voluminous document. The programmers in turn can identify recurring and interesting words and then examine the sections of the document which discussed those interesting words. The interesting words can be added to the dictionary, and can be defined at that point in time or at a later point in time. Consequently, the programmers have easily established a dictionary for the proposed system using the present invention.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method to identify and link together information in a computer domain comprising the steps of:
   storing into a first database requirements for application programs in a domain;
   storing into a second database definitions of key terms and key phrases relating to said domain;
   storing into a third database program steps and step definitions for application programs in said domain;
   storing into a fourth database objects, devices and program modules required by said program steps in said domain;
   storing into a fifth database textual documentation describing the application programs in said domain;
   invoking a parsing process to parse any or all of the first, second, third, fourth, and fifth databases in order to identify key words and phrases;
   using said parsing process to establish links between said key words, said phrases and selected said first, second, third, fourth, or fifth databases;
   using said links to traverse from any one of the said first, second, third, fourth, or fifth databases to any of the other said first, second, third, fourth, or fifth databases.

2. The method according to claim 1, wherein said parsing process parses said requirements, dictionary, scenario, hypertext, and thing databases for recurring words or phrases.

3. The method according to claim 1, further comprising the steps of:

accessing said third database to determine said program steps for a particular program;

identifying words that occur in both said third database and also in said first database, said second database, said fourth database, or said fifth database;

linking said third database to any of said first database, said second database, said fourth database or said fifth that contain said words; and using said first database, said second database, said third database, said fourth database, and said fifth database to write a program implementing said program steps of said third database.

4. The method according to claim 1, further comprising the step of highlighting said key words and phrases identified by said parsing process.

5. The method according to claim 1, further comprising the step of deleting words from said words located by said parsing process before said parsing process establishes said links.

6. The method according to claim 1, further comprising the step of placing words occurring two or more times in said computer domain into said second database.

7. A computer system to identify and link together information in a computer domain comprising:

means for storing into a first database requirements for application programs in a domain;

means for storing into a second database definitions of key terms and key phrases relating to said domain;

means for storing into a third database program steps and step definitions for application programs in said domain;

means for storing into a fourth database objects, devices and program modules required by said program steps in said domain;

means for storing into a fifth database general textual information describing applications in said domain;

means for parsing said first, second, third, fourth and fifth databases in order to identify key words and phrases;

means for establishing links between said key words, said phrases and said first, second, third, fourth, and fifth databases;

means for traversing from any one of the said first, second, third, fourth, or fifth databases to any of the other first, second, third, fourth, or fifth databases.

* * * * *